US008759779B2

(12) United States Patent
Kajiki et al.

(10) Patent No.: US 8,759,779 B2
(45) Date of Patent: Jun. 24, 2014

(54) TERAHERTZ WAVE GENERATION ELEMENT, TERAHERTZ WAVE DETECTION ELEMENT, AND TERAHERTZ TIME DOMAIN SPECTRAL DEVICE

(75) Inventors: Kousuke Kajiki, Tokyo (JP); Takeaki Itsuji, Hiratsuka (JP); Ryota Sekiguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 17 days.

(21) Appl. No.: 13/214,786

(22) Filed: Aug. 22, 2011

(65) Prior Publication Data

US 2012/0049072 A1 Mar. 1, 2012

(30) Foreign Application Priority Data

Aug. 24, 2010 (JP) ................................. 2010-187564
Jul. 22, 2011 (JP) ................................. 2011-161412

(51) Int. Cl.
*G01J 5/02* (2006.01)
*G02F 1/39* (2006.01)
*G01J 3/10* (2006.01)

(52) U.S. Cl.
CPC . *G01J 5/02* (2013.01); *G02F 1/395* (2013.01); *G01J 3/10* (2013.01)
USPC ........................................................ 250/351

(58) Field of Classification Search
CPC ........ G02F 1/395; G02F 2203/13; G01J 5/02; G01J 3/10
USPC ........................................................ 250/341.1
See application file for complete search history.

(56) References Cited

U.S. PATENT DOCUMENTS

| | | | | |
|---|---|---|---|---|
| 6,388,799 | B1* | 5/2002 | Arnone et al. | 359/326 |
| 7,626,756 | B2* | 12/2009 | Dunn et al. | 359/330 |
| 2003/0227668 | A1* | 12/2003 | Imai et al. | 359/326 |
| 2004/0095633 | A1* | 5/2004 | Nee et al. | 359/326 |
| 2006/0153255 | A1* | 7/2006 | Wada et al. | 372/32 |
| 2008/0265165 | A1* | 10/2008 | Yeh et al. | 250/341.1 |
| 2009/0232462 | A1* | 9/2009 | Creeden et al. | 385/122 |
| 2009/0251767 | A1* | 10/2009 | Ikari et al. | 359/330 |

OTHER PUBLICATIONS

Horita et al., "Efficient Electro-Optic Detection of THz Wave with Cherenkov-Type Phase Matching," The Annual Meeting of the Spectroscopical Society of Japan, Nov. 18-20, 2010, pp. cover page, x-xvi, and 128.
Hebling et al., "Generation of High-Power Terahertz Pulses by Tilted-Pulse-Front Excitation and their Application Possibilities," Optical Society of America, Apr. 2, 2008, J.Opt.Soc.Am/vol. 25, No. 7/Jul. 2008/pp. B6-B19.
Suizu et al., "Extremely Frequency-Widened Terahertz Wave Generation Using Cherenkov-Type Radiation," Optical Society of America, 2009, Apr. 13, 2009/vol. 17, No. 8/Optics Express/pp. 6676-6681.

* cited by examiner

*Primary Examiner* — Marcus Taningco
(74) *Attorney, Agent, or Firm* — Canon U.S.A., Inc. IP Division

(57) ABSTRACT

A terahertz wave generation element includes a plurality of waveguides including an electro-optic crystal, and an optical coupling member for extracting a terahertz wave to the outside. The terahertz wave is generated when light propagates through the waveguides. The waveguides are arranged to be rotationally symmetric with respect to a predetermined axis. The optical coupling member is arranged so that wave fronts of the terahertz waves generated from the waveguides are matched together.

9 Claims, 9 Drawing Sheets

TERAHERTZ WAVE GENERATION ELEMENT, TERAHERTZ WAVE DETECTION ELEMENT, AND TERAHERTZ TIME DOMAIN SPECTRAL DEVICE

BACKGROUND OF THE INVENTION

1. Field of the Invention

The present invention relates to a terahertz wave generation element for generating terahertz waves including electromagnetic wave components in a frequency domain from a millimeter wave band to a terahertz wave band (30 GHz to 30 THz), a terahertz wave detection element for detecting a terahertz wave, and a terahertz time domain spectral device using at least one of the above elements. In particular, the present invention relates to a generation element including an electro-optic crystal for generating or detecting an electromagnetic wave including a Fourier component in the above frequency domain by irradiating laser light and a tomography device using a terahertz time domain spectral method (THz-TDS) including the generation element.

2. Description of the Related Art

In recent years, a nondestructive sensing technique using a terahertz wave has been developed. As an application field of electromagnetic waves in this frequency band, there is a technique for forming a safe examination device, which is an alternative to an x-ray device, and performing imaging. Also, a spectroscopic technique for studying physical properties such as a molecular bonding state by obtaining an absorbing spectrum and a complex dielectric constant in a material, a measuring technique for studying physical properties such as carrier concentration, carrier mobility, and electric conductivity, and an analysis technique for biomolecules have been developed. As a method for generating a terahertz wave, a method using a nonlinear optical crystal is widely known. Typical examples of the nonlinear optical crystal include $LiNbO_x$, (hereinafter also referred to as LN), $LiTaO_x$, $NbTaO_x$, KTP, DAST, ZnTe, GaSe, GaP, and CdTe. A second-order nonlinear phenomenon is used to generate a terahertz wave. As a method, difference-frequency generation (DFG) by inputting two laser beams having frequencies different from each other is known. Also, monochromatic terahertz wave generation by an optical parametric process and a method for generating terahertz pulses by optical rectification by irradiating a femtosecond pulse laser beam are known.

As a process for generating a terahertz wave from such a nonlinear optical crystal, electro-optic Cerenkov radiation attracts attention recently. This is a phenomenon as shown in FIG. 7 in which, when a propagation group velocity of laser beam 100 which is an excitation source is faster than a propagation phase velocity of a generated terahertz wave, a terahertz wave 101 is emitted conically like a shock wave. A radiation angle $\theta_c$ is determined by the following formula using a ratio of refractive index of light to a terahertz wave in a medium (nonlinear optical crystal).

$$\cos \theta_c = vTH_z/v_g = n_g/nTH_z$$

Here, $v_g$ and $n_g$ respectively represent a group velocity and a group refractive index of excitation light, and $vTH_z$ and $nTH_z$ respectively represent a phase velocity and a refractive index of the terahertz wave. Regarding the Cerenkov radiation phenomenon, there is a report in which a monochromatic terahertz wave is generated by the DFG method using a slab waveguide having a thickness sufficiently smaller than a wave length of the generated terahertz wave ("Opt. Express, vol. 17, pp. 6676-6681, 2009": Document 1).

Such an example of Document 1 is generation of a terahertz wave by traveling wave excitation, so this relates to a proposal in which terahertz waves generated from different wave sources are phase-matched in radiation direction and strengthen each other and thereby extraction efficiency is improved. The features of the radiation method are that relatively high efficiency of radiation can be achieved and a high intensity terahertz wave can be generated when a nonlinear optical crystal is used, and the frequency band of the terahertz wave can be widened by selecting absorption of terahertz area by phonon resonance peculiar to a crystal on the high frequency side. In these techniques, the frequency band can be wider than that of terahertz waves generated by a photoconductive device, and the pulse width can be narrowed in a case of terahertz pulse generation using optical rectification, and for example, it is expected to improve device performance when these techniques are used in a terahertz time domain spectral device.

However, in the method described in Document 1, electric field intensity distribution in a cross-section of a radiated terahertz wave beam is asymmetrical with respect to the optical axis. This is because the wavelength of the light is dispersed as the light propagates in a waveguide and the electric field intensity of the generated terahertz wave decreases.

SUMMARY OF THE INVENTION

A terahertz wave generation element according to an aspect of the present invention includes a plurality of waveguides including an electro-optic crystal, and an optical coupling member for extracting a terahertz wave to the outside. The terahertz wave is generated when light propagates through the waveguides. The waveguides are arranged to be rotationally symmetric with respect to a predetermined axis. The optical coupling member is arranged so that wave fronts of the terahertz waves generated from the waveguides are matched together.

A terahertz wave generation element according to an aspect of the present invention has a structure in which wave fronts of a plurality of terahertz waves are substantially matched (that is, equi-phase planes are substantially matched) by arranging a plurality of waveguides that respectively generate a plurality of terahertz waves having an asymmetric beam cross-section in rotationally symmetric positions with respect to a predetermined axis. Therefore, symmetric property of the electric field distribution in the beam cross-section of the generated terahertz wave can be improved. For example, the radiated terahertz wave can have a beam cross-section substantially rotationally symmetric with respect to a predetermined axis.

Further features of the present invention will become apparent from the following description of exemplary embodiments with reference to the attached drawings.

DESCRIPTION OF THE EMBODIMENTS

A terahertz wave generation element is characterized in that a plurality of waveguides are arranged to be rotationally symmetric with respect to a predetermined axis and an optical coupling member for extracting a terahertz wave to the outside is arranged so that wave fronts of terahertz waves generated from the plurality of waveguides are substantially matched. In this way, symmetric property of the electric field distribution in a beam cross-section of the generated terahertz wave is improved. On the other hand, a terahertz wave can be detected by the same configuration and the reverse process. An electro-optic crystal used here for a first-order electro-optic effect has a second-order nonlinearity. Generally, a practical electro-optic crystal is substantially equivalent to a nonlinear optical crystal having a second-order nonlinearity. In this specification, rotation symmetry means an arrangement relationship of a plurality of waveguides in which a certain waveguide can be overlapped on another waveguide by rotating the waveguide around a predetermined axis by a certain angle. Here, the waveguide to be overlapped is a part of a waveguide which actually propagates light and generates a terahertz wave, and it does not necessarily mean that the entire shape of the waveguide is overlapped.

Hereinafter, embodiments and a practical example will be described with reference to the drawings.

First Embodiment

Figure 1A:
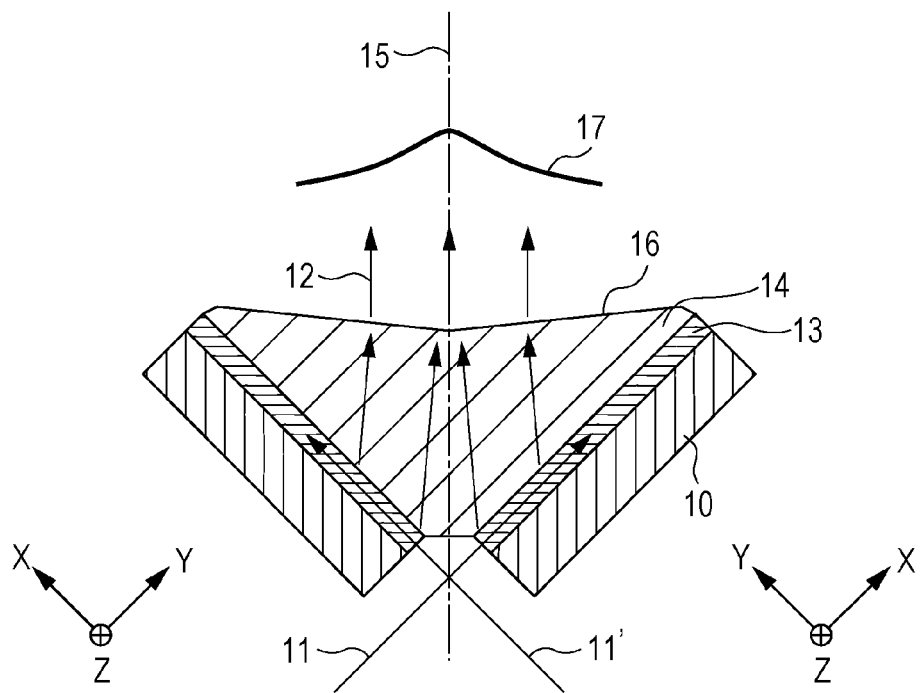
FIG. 1A is a cross-sectional view of a terahertz wave generation element according to a first embodiment of the present invention.
Figure 1B:
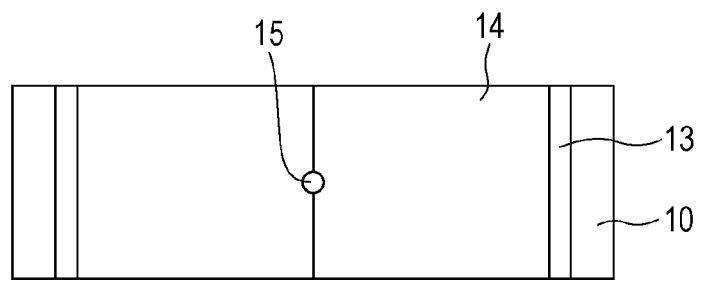
FIG. 1B is a top view of the terahertz wave generation element according to the first embodiment of the present invention.

A terahertz wave generation element, which uses an LN crystal, according to a first embodiment of the present invention will be described with reference to FIGS. 1A and 1B. FIG. 1A is a cross-sectional view of the terahertz wave generation element. FIG. 1B is a top view of the terahertz wave generation element. An LN substrate 10 is a Y-cut lithium niobate. A propagation direction of laser beam 11 (hereinafter, laser beam 11 also represents laser beam 11') is X axis of the LN crystal. A direction perpendicular to a Y axis and the propagation direction (X axis) is defined as Z axis (see coordinate axes shown in FIG. 1A). The laser beam 11 is a linearly polarized wave in the Z direction. By forming such a configuration, it is possible to efficiently generate electro-optic Cerenkov radiation, which is a second-order nonlinear phenomenon. In addition, crystal axes are set so that a terahertz wave 12 generated by Cerenkov radiation by a second-order nonlinear process and the laser beam 11 can be phase-matched. In other words, the crystal axes are set so that a phase matching condition is established between wave number vectors of light waves (terahertz wave 12 and laser beam 11) related to the second-order nonlinear process.

A waveguide 13 for propagating the incident laser beam 11 by total internal reflection is formed on the LN substrate 10. The waveguide 13 is formed by a layer (core portion) (not shown in the drawings) of an MgO doped LN crystal layer and a low refractive index buffer layer (not shown in the drawings). To realize wave guiding by total internal reflection, the refractive indexes of the LN substrate 10 and the low refractive index buffer layer are set to be lower than the refractive index of a waveguide layer (core portion) of a high refractive index layer. The thickness of the low refractive index buffer layer can be sufficiently thick to function as a cladding layer when the laser beam 11 propagates through the waveguide layer and thin enough so that influence of multiple reflection and loss can be ignored when the terahertz wave 12 is radiated to the outside by an optical coupling member 14. For the former condition, the thickness can be larger than or equal to a thickness in which light intensity on the interface between the optical coupling member 14 and the waveguide in which the waveguide layer is the core and the buffer layer is a cladding layer is smaller than or equal to $1/e^2$ of light intensity of the core area (e is the base of natural logarithm). For the latter condition, the thickness can be about one tenth or less of an equivalent wavelength $\lambda_{eq}$ in the low refraction buffer layer of the terahertz wave 12 having the highest frequency radiating to the outside (highest frequency component). Because it is assumed that, in a structure having one tenth size of a wavelength, generally, influence of reflection, scattering, refraction, and the like of an electromagnetic wave having the wavelength can be ignored. However, a terahertz wave can be generated from the terahertz wave generation element of the present invention even when the thickness is out of the range of the thickness described above.

The structure of the waveguide 13 can be formed by a method in which the waveguide layer is formed to have a high refractive index different from that of surrounding areas by Ti diffusion and a method in which the waveguide layer is formed to have a ridge shape by etching and the surrounding areas are buried with a resin or the like. The waveguide structure may be a slab waveguide in which the area of the waveguide widens in the Z direction and there is no confined structure. Here, a cross-section of the incident light 11 may have, for example, an elliptical shape. In this case, a rod-shaped rod lens is used as a lens for coupling the light 11 into the waveguide 13, and the light 11 may be squeezed only in the vertical direction in the layer structure of the waveguide 13. The optical coupling member 14 for extracting the generated terahertz wave 13 to the outside is provided on the waveguide 13.

When a laser beam of a polarized wave in parallel with the Z axis, that is, a horizontal polarized wave, is inputted into the waveguide 13 shown in FIGS. 1A and 1B, and the laser beam is propagated along the X axis, the terahertz wave 12 is generated from the surface of the crystal by a principle described in Document 1 shown in Description of the Related Art or optical rectification using an ultrashort pulse light source. The generated terahertz wave 12 can be extracted to the outside (here, space) via the optical coupling member 14. A Cherenkov radiation angle determined by the refractive index difference between the light and the terahertz wave in LN is about 65 degrees. When the optical coupling member 14 is formed so that the terahertz wave 12 can pass through the interface between the waveguide 13 and the optical coupling member 14 without totally reflecting on the interface, as the material of the optical coupling member 14, high resistivity Si in which the loss of terahertz wave is small can be used.

In FIGS. 1A and 1B, the terahertz wave generation element has a plurality of waveguides, that is, two terahertz wave generation units as described above, and the terahertz wave generation units are arranged in double rotational symmetry with respect to a predetermined axis 15 (that is, positional relationship in which, when one generation unit is rotated by 180 degrees, the generation unit overlaps the other rotation unit, and when the generation unit is further rotated by 180 degrees, the generation unit returns to the original position). As the predetermined axis 15, a direction in which the terahertz wave 12 is desired to be radiated may be selected. Here, to form one equi-phase plane by combining wave fronts of the terahertz waves 12 emitted from terahertz wave emitting surfaces 16 of the two terahertz wave generation units, the angle between the terahertz wave emitting surface 16 of the optical coupling member 14 and the predetermined axis 15 is important. This angle can be selected so that the radiated terahertz wave 12 is in parallel with the predetermined axis 15. In FIGS. 1A and 1B, by employing such a configuration, an electric field distribution 17 similar to a so-called Gaussian beam can be obtained. The wave fronts of the terahertz wave radiated from a plurality of generation units can be matched by arranging the terahertz wave generation units having the configuration described above in rotationally symmetry with respect to the predetermined axis 15 (direction in which the terahertz wave is desired to be radiated, optical axis). And, it is possible to form a rotationally symmetric beam cross-section with respect to the optical axis.

Figure 2A:
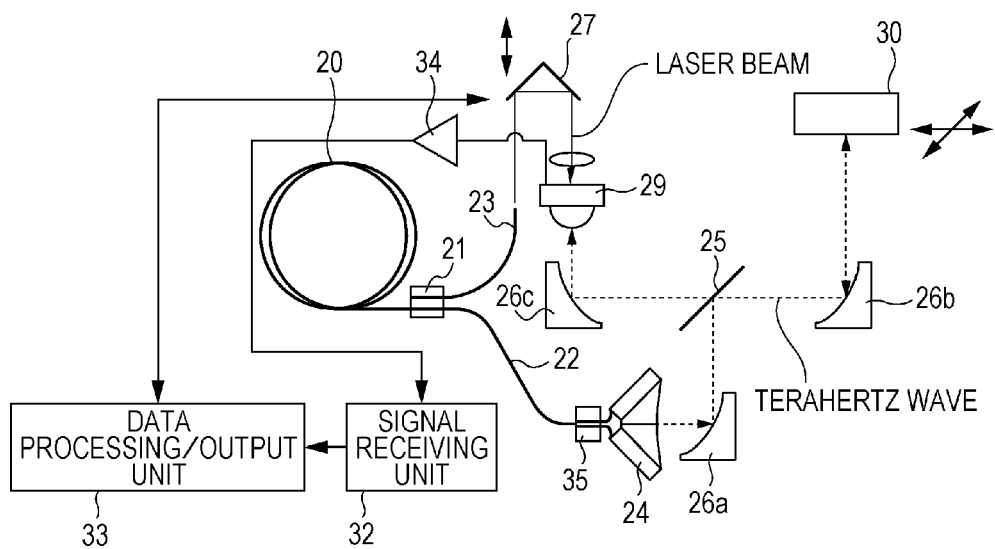
FIG. 2A is a configuration diagram of a tomography device according to an embodiment of the present invention.

FIG. 2A shows an example of a tomographic imaging device using a terahertz time domain spectral device (THz-TDS) formed by using the above-described element as a terahertz wave generation element. Here, a femtosecond laser 20 is used as an excitation light source and outputs are extracted from a fiber 22 and a fiber 23 via a branch unit 21. Typically, a femtosecond laser 20 whose center wavelength is 1.55 μm, pulse width is 20 fs, and repetition frequency is 50 MHz is used. However, the wavelength may be a 1.06 μm band, and the pulse width and the repetition frequency are not limited to the values mentioned above. The fibers 22 and 23 in the output stage may include a highly-nonlinear fiber for high-order solution compression in the final stage and a dispersive fiber that performs prechirp for compensating distribution caused by optical elements on the path to the terahertz wave generator and detector. These fibers are desired to be a polarization maintaining fiber.

Figure 2B:
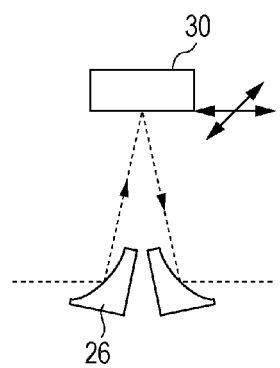
FIG. 2B is a configuration diagram of a tomography device according to an embodiment of the present invention.
Figure 2C:
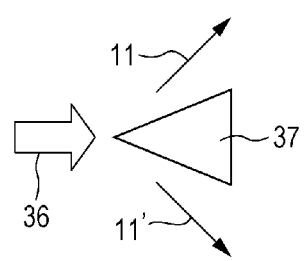
FIG. 2C is a configuration diagram of a tomography device according to an embodiment of the present invention.

The output from the fiber 22 on the terahertz wave generation side is coupled to a waveguide of a terahertz wave generation element 24 of the present invention described above. In this case, the terahertz wave generation element 24 of the present invention has a plurality of waveguides to which light is inputted, so the light needs to be branched corresponding to the waveguides. A beam splitter 35 shown in FIG. 2A can be used as a branch unit for branching the light. As shown in FIG. 2C, light 36 emitted from the fiber before being branched may be branched into the light 11 and the light 11' by a prism 37.

It is desired to improve coupling efficiency by controlling the output to be smaller than or equal to the numerical aperture of the waveguide of the element 24 by integrating SELFOC lenses at the front end of the fiber and/or forming the front end to have a processed pigtail shape. Of course, space coupling is possible by using a lens (not shown in the drawings). In the above cases, if nonreflective coating is applied to each end, Fresnel loss and unnecessary interference noise can be reduced. Or, if it is designed so that NAs and mode field diameters of the fiber 22 and the waveguide of the element 24 are similar to each other, the fiber 22 and the waveguide may be bonded together by direct butting coupling (butt coupling). In this case, an adverse effect of reflection can be reduced by properly selecting an adhesive. If the fiber 22 in the previous stage and the fiber laser 20 include a fiber portion that is not a polarization maintaining fiber, it is desired to stabilize polarization of the light inputted into the Cherenkov radiation element 24 by an in-line type polarization controller. However, the excitation light source is not limited to a fiber laser, and when the excitation light source is not a fiber laser, the action for stabilizing polarization is alleviated.

The generated terahertz wave is detected by the configuration formed by the THz-TDS method shown in FIG. 2A. Specifically, the terahertz wave is converted into a collimated beam by a parabolic mirror 26a, branched by a beam splitter 25, and one terahertz wave is irradiated to a sample 30 via a parabolic mirror 26b. The terahertz wave reflected from the sample 30 is collected by a parabolic mirror 26c and reaches a detector 29 formed by a photoconductive element. Then the terahertz wave is received by the detector 29. As the photoconductive element, typically, an element in which a dipole antenna is formed on low-temperature growth GaAs is used. If the light source 20 is 1.55 μm, a second harmonic wave is generated by using an SHG crystal not shown in the drawings, and the second harmonic wave is used as probe light of the detector 29. In this case, as the SHG crystal, to maintain a pulse shape, PPLN (Periodic Poled Lithium Niobate) having a thickness of about 0.1 mm is desired to be used. If the light source 20 is 1 μm band, a fundamental wave can be used as the probe light without generating a second harmonic wave in the detector 29 of the photoconductive element formed by a single layer of InGaAs or MQW. In the present device, a detection signal is received by a signal receiving unit 32 from the detector 29 via an amplifier 34. It is possible to synchronously detect the terahertz wave by modulating the terahertz wave. In a data processing/output unit 33, a terahertz signal waveform is received while an optical delay device 27, which is a delay unit, is moved by using a PC or the like. The delay unit may be any unit which can adjust delay time between the time when the terahertz wave is generated in the element 24 which is a generation unit and the time when the terahertz wave is detected by the detector 29 which is a detection unit. As described above, the present device is provided with the generation unit including the terahertz wave generation element of the present invention for generating the terahertz wave, the detection unit for detecting the terahertz wave radiated from the generation unit, and the delay unit. The present device is configured as a tomography device in which the detection unit detects the terahertz wave which is radiated from the generation unit and reflected from the sample and images an internal structure of the sample by analyzing the light reflected from the sample.

In the system shown in FIG. 2A, the wave reflected from the sample 30 that is an object to be measured and the irradiated terahertz wave are on the same axis, and the power of the terahertz wave is halved by the beam splitter 25. Therefore, as shown in FIG. 2B, the power of the terahertz wave may be increased by increasing the number of the mirrors 26 to form a non-coaxial configuration even though the incident angle to the sample is not 90 degrees.

In the present device, if there is a discontinuous portion in the material of the sample 30, a reflection echo pulse appears at a temporal position corresponding to the discontinuous portion in the received signal, if the sample is one-dimensionally scanned, a tomographic view can be obtained, and if the sample is two-dimensionally scanned, a three-dimensional image can be obtained. It is possible to reduce blur in an image due to asymmetrical components of the beam by using a terahertz wave beam having high symmetry by employing the generation unit as described in the present embodiment, and a more detailed structure of the sample can be observed in a tomographic measurement. In addition, it is possible to obtain a relatively narrow terahertz pulse having a width of 300 fs or less in monopulse, so the resolution in the depth direction can be improved. Further, it is possible to use an excitation laser using a fiber as an irradiation unit, so the size and the cost of the device can be reduced. Here, an LN crystal is used as the material, as another electro-optic crystal, $LiTaO_x$, $NbTaO_x$, KTP, DAST, ZnTe, GaSe, GaP, or CdTe mentioned in Description of the Related Art can be used. Although, when using LN, it is possible to extract the terahertz wave which have a refractive index different from that of the excitation light as described in Description of the Related Art and is generated in a non collinear state, when using another crystal, it may be difficult to extract a terahertz wave because the difference of the refractive index is not necessarily large. However, if a prism (for example, Si) having a refractive index larger than that of the electro-optic crystal, the condition of the Cerenkov radiation ($vTH_z < v_g$) is satisfied and the terahertz wave can be extracted to the outside.

Practical Example 1

Figure 3:
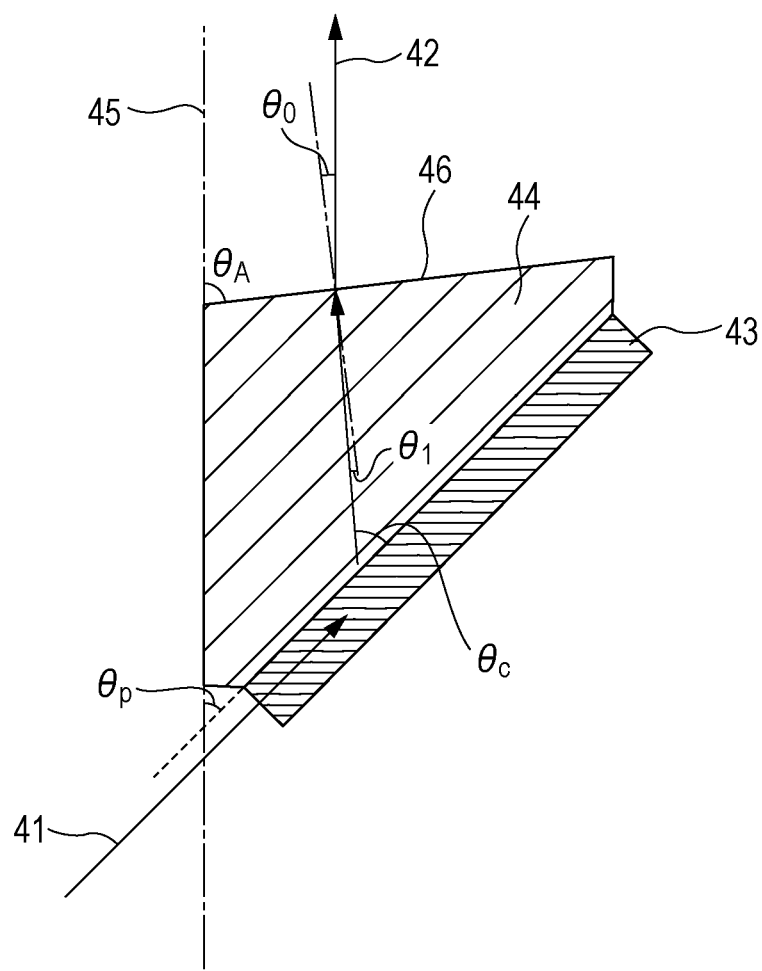
FIG. 3 is an illustration of the terahertz wave generation element according to the first embodiment and a first practical example of the present invention.

A more specific practical example 1 corresponding to the first embodiment will be described. In the present practical example, a layer doped with MgO (core portion) having a thickness of 3.8 μm (not shown in the drawings) is formed. Further, a low refractive index buffer layer (not shown in the drawings) having a width of 5 μm and a thickness of 2 μm is formed of an optical adhesive. In the present practical example, for example, when the terahertz wave is up to 7 THz, the wavelength in a free space is about 43 μm. If it is assumed that the equivalent wavelength is a value obtained by dividing the wavelength by the refractive index 1.5 of the low refractive index buffer layer, the thickness of the low refractive index buffer layer is set to 2 μm so that the thickness is smaller than $\lambda_{eq}/10$ (=43/1.5/10) as described in the first embodiment. Further, an optical coupling member 44 formed of high resistivity Si is closely attached to the low refractive index buffer layer. FIG. 3 shows a schematic view of the structure described above.

In the structure shown in FIGS. 1A and 1B, two such structures are arranged in double rotational symmetry with respect to a predetermined axis 45. The distance between a position at which light 41 enters a waveguide 43 and the predetermined axis 45 is 0.2 mm. This distance may be changed considering the ease of inputting the light 41. An angle $\theta_p$ between the predetermined axis 45 and the light propagation direction in the waveguide 43 is 45 degrees. Here, when the materials described above are used, an angle $\theta_c$ in which the terahertz wave 42 emits into the optical coupling member 44 is 49 degrees with respect to the direction of the waveguide 43. To form a flat equi-phase plane by combining terahertz waves 42 radiated from two generation units, an angle $\theta_A$ between a terahertz wave emitting surface 46 and the predetermined axis 45 is set as shown by the following formula.

$\tan \theta_A = (n_O/n_{clad} - \cos(\theta_p - \theta_c))/\sin(\theta_p - \theta_c)$ Here, $\theta_c$ is an angle between the light propagation direction in the waveguide 43 and the terahertz wave 42 emitted from the waveguide 43 (here, $\theta_c = a \cos(n_{opt}/n_{clad})$), and $n_O$ is a refractive index at a portion in contact with the optical coupling member 44 on the terahertz wave emitting surface 46 (air in the case described above). Further, $n_{opt}$ is a refractive index of the core portion of the waveguide at the wavelength of the light, and $n_{clad}$ is a refractive index of the optical coupling member at the wavelength of the terahertz wave.

The formula can be derived by considering the output angle of the terahertz wave according to the Cherenkov method and Snell's law on the terahertz wave emitting surface 46 of the optical coupling member 44. Specifically, if the Snell's law on the terahertz wave emitting surface 46 is represented using formulas by assuming that the predetermined axis 45 is in parallel with the direction of the terahertz wave 42 emitted from the terahertz wave emitting surface 46 of the optical coupling member 44, three formulas described below can be obtained (see FIG. 3 for $\theta_1$ and the like in the formulas).

Snell's law $n_{clad} \sin \theta_1 = n_0 \sin \theta_0$ $\theta_1 = \pi/2 - \theta_A - \theta_c + \theta_p$ $\theta_0 = \pi/2 - \theta_A$ By substituting $\theta_1$ and $\theta_0$ into the first formula and calculating, the formula of $\theta_A$ described above can be obtained.

According to the formula of $\theta_A$, $\theta_A$ may be 83 degrees for the configuration described above. Accordingly, $\theta_1$ is 2 degrees, and $\theta_0$ is 7 degrees. If the formula of $\theta_A$ is used, other structures (angles) can be designed. For example, if $\theta_p$ is desired to be set to 95 degrees that is larger than the above value in order to avoid mechanical interference of the optical elements for emitting the light 41 into the waveguide 43, it is found that $\theta_A$ should be 87 degrees.

The formula of $\theta_A$ is a condition to match the wave fronts of the terahertz waves emitted from the two generation units. Therefore, if the wave fronts may be shifted from each other in some degree, the angle need not be strictly match the angle given by the formula. The degree of the matching can be selected by a user considering a manufacturing method, mechanical interference, quality of imaging, and the like. For example, if the emitting direction of the terahertz wave 42 is shifted 5 degrees from the predetermined axis 45, the terahertz waves radiated from the two generation units are 9 mm apart from each other after propagation of 50 mm. This means that there is no terahertz wave in a range of about 9 mm from the center of the beam. Thus, for example, the corresponding area cannot be used for imaging.

Although, in the present practical example, the number of the terahertz wave generation units is two, of course, the number may be greater than two if the arrangement of the terahertz wave generation unit satisfies the above formulas. For example, three terahertz wave generation units may be arranged in triple rotational symmetry with respect to a predetermined axis. Although a plurality of terahertz wave generation units are arranged around the predetermined axis at regular angle intervals, the terahertz wave generation units may be arranged at irregular angle intervals even though the symmetric property of the electric field distribution in the beam cross-section of the generated terahertz wave is degraded in some degree. Further, for example, a plurality pairs (for example, two pairs) of the terahertz wave generation units in double rotational symmetry shown in FIGS. 1A and 1B may be arranged in the Z direction in FIG. 1A. In this case, a line-shaped beam having a long axis in the Z direction can be obtained.

The terahertz wave generation element of the present practical example may include a lenticular medium for collecting or collimating the terahertz wave 42 emitted from the optical coupling member 44. The lenticular medium may be provided outside the terahertz wave emitting surface 46 of the optical coupling member 44 or may be in contact with the terahertz wave emitting surface 46. In the latter case, the refraction index of the lenticular medium is required to be used as $n_0$ in the above formulas.

Second Embodiment

Figure 4:
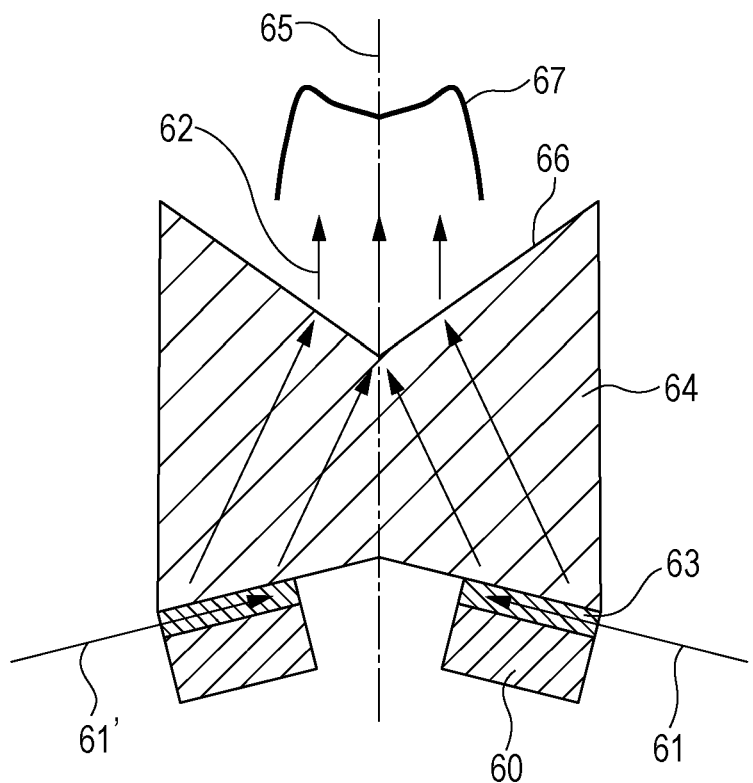
FIG. 4 is a structure diagram of a terahertz wave generation element according to a second embodiment of the present invention.

A second embodiment of the present invention will be described with reference to FIG. 4. The present embodiment is different from the first embodiment and the structural feature of the present embodiment is that light inputting ends of waveguides 63 are far away from a predetermined axis 65. However, the idea that the generated terahertz waves 62 are refracted by terahertz wave emitting surfaces 66 of optical coupling members 64 and the terahertz waves 62 from two terahertz wave generation units are coupled together is the same.

Figure 6:
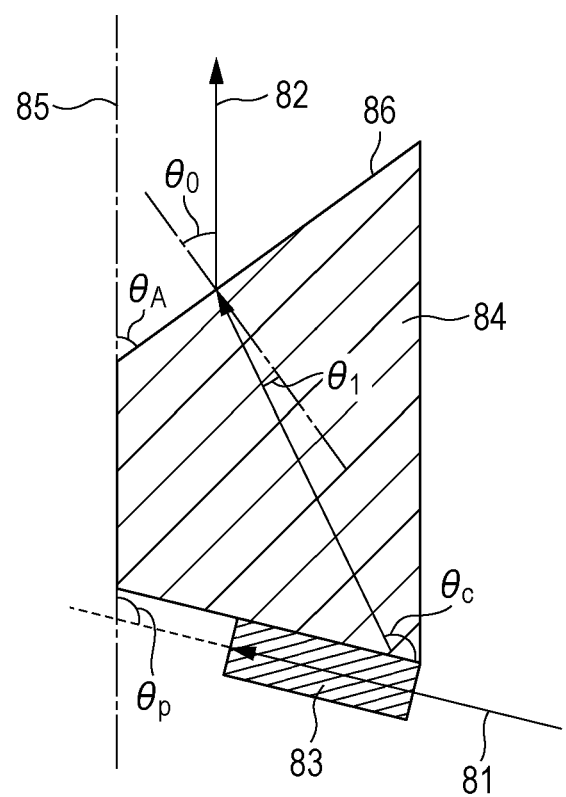
FIG. 6 is an illustration of the terahertz wave generation element according to the second embodiment of the present invention.
Figure 7:
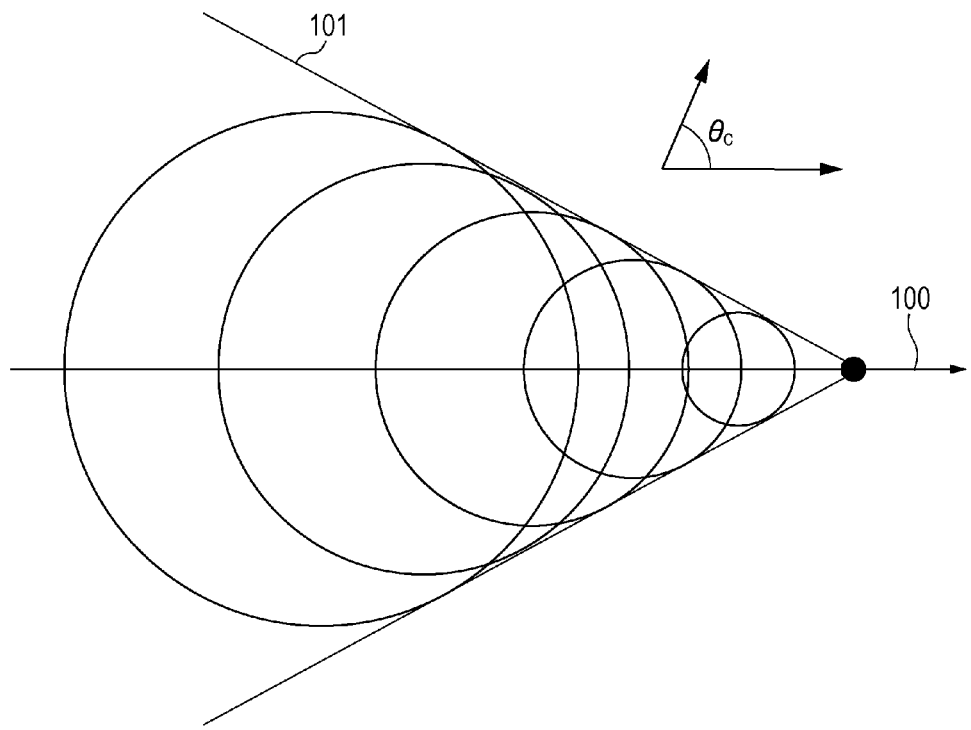
FIG. 7 is a conceptual diagram of electro-optic Cerenkov radiation.

The formula of $\theta_A$ can also be applied here. FIG. 6 is an example (in FIG. 6, reference numerals of 80s are used). In FIG. 6, $\theta_A$ is 54 degrees and $\theta_p$ is 104 degrees. $\theta_1$ is 10 degrees and $\theta_0$ is 36 degrees. In the structure of the present embodiment, it is considered that a laser beam 61 (61') becomes stray light after being emitted from the waveguide 63 on a substrate 60 and causes negative influence, so the emitting end of the waveguide 63 may be cut and the optical path of the laser beam is changed or a light absorber may be formed at the emitting end. According to the present embodiment, as shown in FIG. 4, the distribution in the beam cross-section having a shape similar to a top that can be obtained.

Third Embodiment

In the above description, an example is mainly explained in which a femtosecond laser beam is used as excitation light, the femtosecond laser beam is inputted into a plurality of waveguides of a terahertz wave generation element at the same time, and terahertz pulses are generated in each waveguide by optical rectification. On the other hand, in the third embodiment, a laser beam having two different oscillating frequencies v1 and v2 is inputted and a monochromatic terahertz wave corresponding to the difference frequency is emitted. As the laser light source, a KTP-OPO (Optical Parametric Oscillator) light source of Nd:YAG laser excitation (this outputs two-wavelength light) or two wavelength-variable laser diodes can be used. Although a structure as shown in FIGS. 1A and 1B according to the first embodiment can be used, in the present embodiment, the length of the waveguide may be longer in order to increase the output of the terahertz wave. For example, the length of the waveguide can be 40 mm.

In the present embodiment, when the frequency difference of the inputted light is 0.5 THz to 7 THz, the frequency of the radiated terahertz wave can be variable in a range from 0.5 THz to 7 THz. In the present embodiment, an application for performing examination or imaging by using a frequency in a specific terahertz band can be carried out, for example, an examination for investigating the content of a specific substance in a pharmaceutical drug by adjusting the frequency to the absorbing spectrum of the substance can be carried out.

Fourth Embodiment

A fourth embodiment will be described with reference to FIG. 5. In the present embodiment, light emitted from an end portion 80 is reused as the probe light by performing processing such as diagonal cutting or AR coating on the end portion 80 of the waveguide. Specifically, in the present embodiment, the light from the waveguide end portion 80 of a terahertz wave generation element 71 is reused as the probe light to the detection unit, and the delay unit adjusts the delay time between the time when the light reaches the waveguide of the terahertz wave generation element 71 and the time when the probe light reaches the detection unit.

Figure 5:
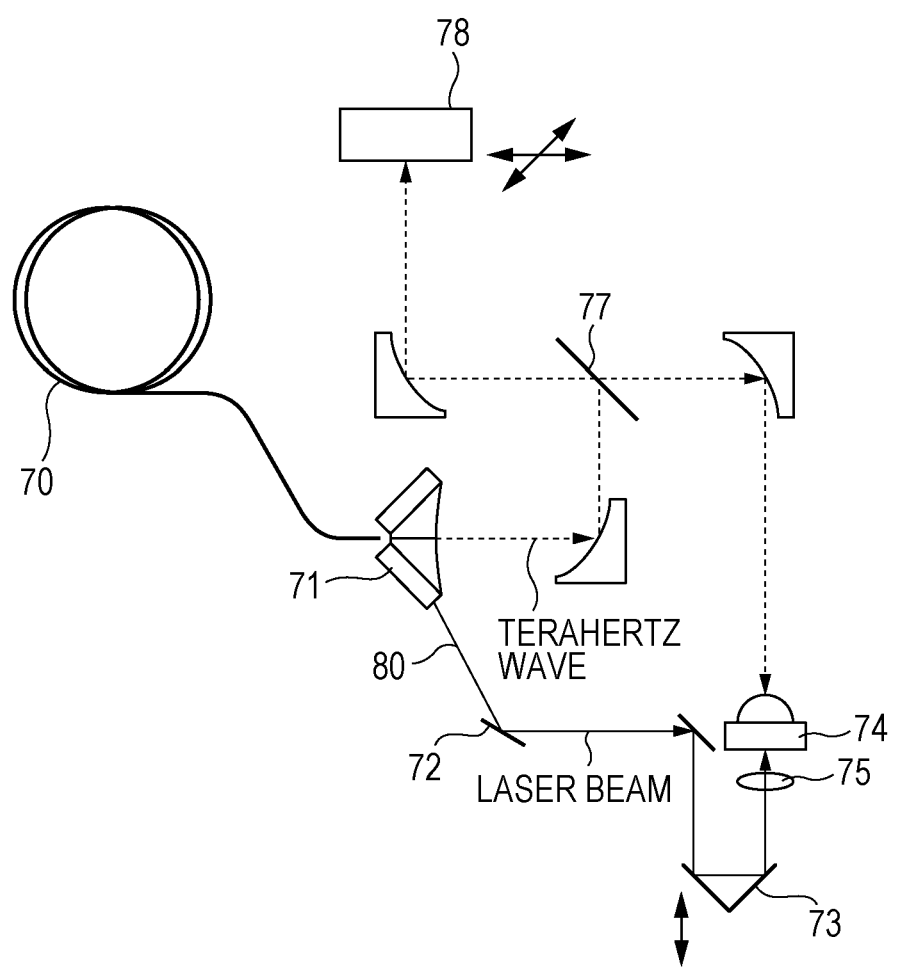
FIG. 5 is a configuration diagram of a tomography device according to another embodiment of the present invention.

FIG. 5 is a diagram showing a tomography device of the THz-TDS method in the same manner as FIG. 2A, and an electric system unit, a processing unit, and an inputting portion to the terahertz wave generation unit are omitted. The point different from the embodiment shown in FIG. 2A is that the fiber branch unit 21 in FIG. 2A is not included and the entire output of an excitation laser 70 including the fiber is inputted into the terahertz wave generation unit 71. The terahertz wave generated from the terahertz wave generation unit 71 is irradiated to a sample 78 through parabolic mirrors and a half mirror 77 in the same manner as in the embodiment shown in FIG. 2A. The reflected light from the sample 78 is inputted into a terahertz detection unit 74 and a signal is received by the terahertz detection unit 74. On the other hand, a part of the laser beam propagated through the terahertz wave generation unit 71 is emitted again from the end portion 80 and reused as the probe light of the detection unit 74 via a mirror 72, a delay unit 73, and a lens 75.

When employing such a configuration, the branch unit of the excitation laser is not required, so it is possible to reduce the number of constituent components and efficiently use the power of the excitation laser 70.

Fifth Embodiment

The feature of a fifth embodiment is that the terahertz wave is emitted at a Brewster's angle on the terahertz wave emitting surface of the optical coupling member. In other words, the incidence angle of the terahertz wave with respect to the emitting surface satisfies the Brewster's condition. Although the configuration is the same as that of the first embodiment, the terahertz wave 12 is p-polarized with respect to the emitting surface 16 of the terahertz wave. To polarize the terahertz wave 12 in such a polarization direction, the electro-optic axis of the LN crystal is in the Y direction, and further the light 11 and the light 11' are linearly-polarized waves in the Y direction.

If the terahertz wave is emitted at the Brewster's angle in this way, the internal reflection is prevented when the terahertz wave is extracted to the outside, so there is a merit that the transmittance can be increased even when no nonreflective coating is applied. When high resistivity Si is used as the optical coupling member 14, if the refractive index with respect to the terahertz wave 12 is 3.4, the Brewster's angle is arctan(1/3.4)=16 degrees. Therefore, in this case, by adjusting $\theta_p$ shown in FIG. 3 to 82 degrees and adjusting $\theta_A$ to 74 degrees, the transmittance of the terahertz wave 12 can be maximum.

Sixth Embodiment

In the present embodiment, an element, which has symmetric property in the same manner as the elements described in the first to the fifth embodiments, functions as a detection element of the terahertz wave. Therefore, here, an ultrashort pulse laser beam is inputted from a surface opposite to that of the embodiments described above (that is, from the surfaces denoted by reference numerals 99 and 99' in FIG. 8), and a polarized wave is tilted from the Z axis direction toward the Y axis direction (for example, by 45 degrees) by linear polarization and inputted. In this case, a phase difference is generated between the Z axis component and the Y axis component of the electric field of the laser beam emitted from the crystal by birefringence of the electro-optic crystal, and an elliptically-polarized wave propagates in the space to which the laser beam is emitted. The phase difference by such spontaneous birefringence varies depending on the type of the crystal, the polarized wave input direction, and the length of the waveguide. A configuration in which the phase difference is zero can also be formed.

Figure 8:
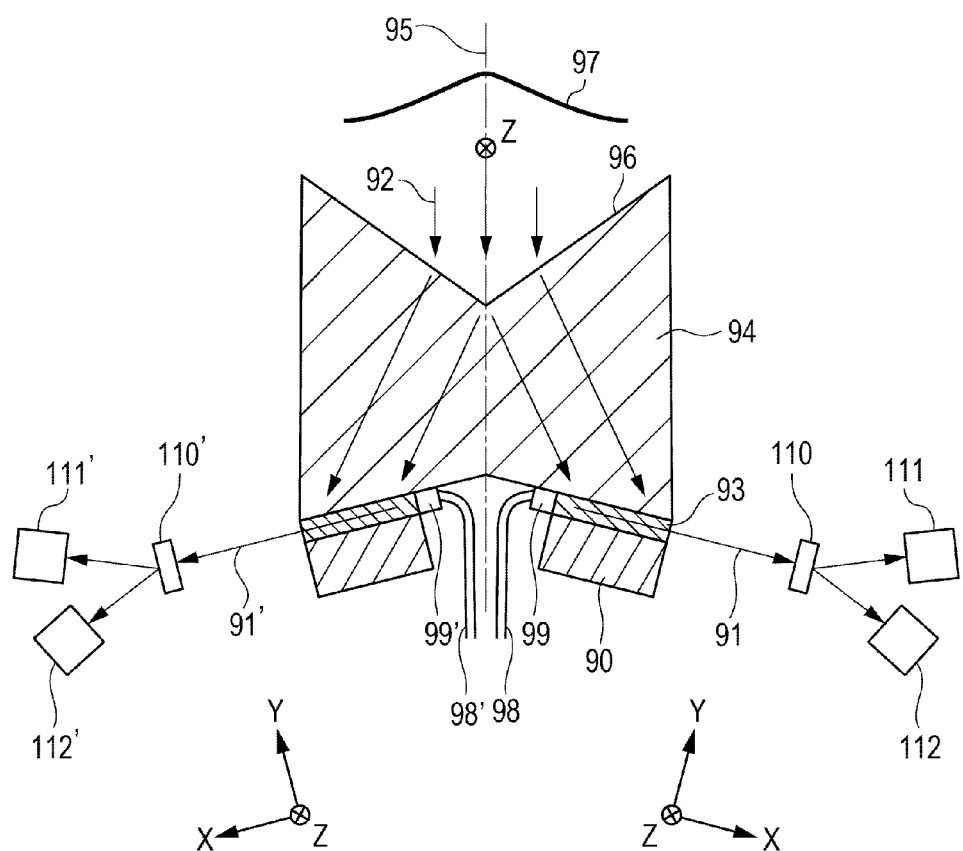
FIG. 8 is a structure diagram of a terahertz wave generation element according to a sixth embodiment of the present invention.

As shown is FIG. 8, when the terahertz wave 92 is inputted from a surface (incidence plane 96) from which the terahertz wave is emitted in the first embodiment and the like by an optical coupling member 94 which is, for example, an Si prism, in the reverse process of the terahertz wave generation, a mutual interaction between ultrashort pulse laser beams 91 and 91' propagating through waveguides 93 and the terahertz wave 92 can be performed in the entire waveguides. In the mutual interaction, the refractive index in the Z axis of the waveguide changes and a polarization state of the propagating light changes by a first-order electro-optic effect (Pockels effect, that is, a kind of effect in a second-order nonlinear process) given to the electro-optic crystal by a terahertz electromagnetical field. Specifically, the phase difference between the Z axis component and the Y axis component of the electric field of the laser beams 91 and 91' is changed by induced birefringence, and the ellipticity of the elliptically-polarized wave and the direction of the main axis change. When the change of the propagation state of the laser beams 91 and 91' is detected by an external polarization element and a light detector, the size of the electric field amplitude of the terahertz wave 92 can be detected. In the present embodiment, two polarizations are divided by Wollaston prisms 110 and 110', and the S/N ratio is improved by differential amplification of two light detectors 111, 111' and 112, 112'. The differential amplification is not essential. 110 and 110' are used as polarizers and the intensity may be detected by only one light detector. It is possible to detect a laser beam obtained by combining the laser beams 91 and 91' by beam splitter or the like.

To compensate the spontaneous birefringence, a phase compensation plate (λ/4 plate or the like not shown in the drawings) may be added between the emitting end and the polarization elements 110, 110'.

Figure 9:
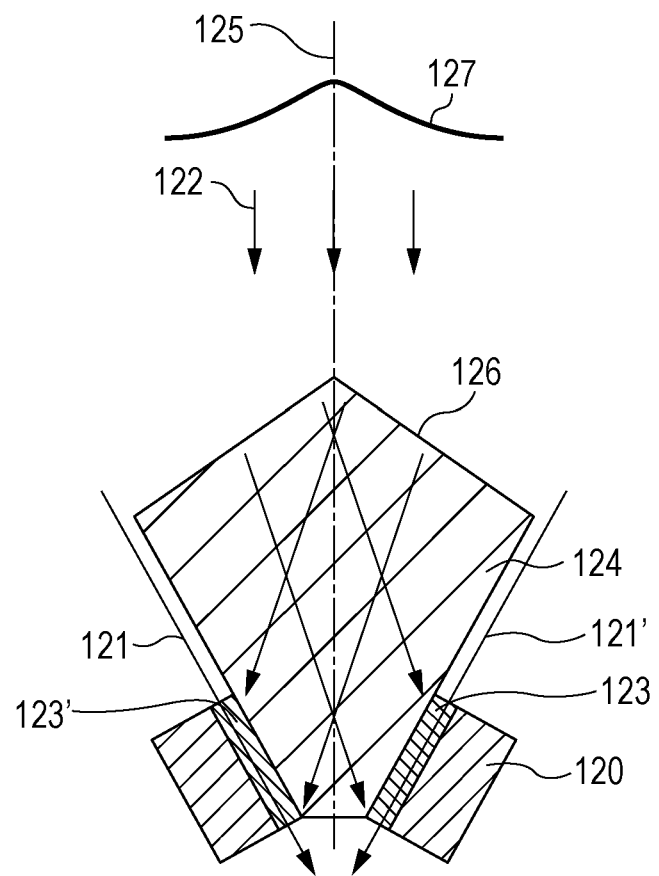
FIG. 9 is another example of the structure diagram of the terahertz wave generation element according to the sixth embodiment of the present invention.

As shown in FIG. 8, when the terahertz wave 92 having a Gaussian-shaped space distribution is inputted, the laser beams 91 and 91' are desired to be inputted into the waveguides 93 and 93' from the side which the peak of the Gaussian shape of the terahertz wave 92 reaches. Because the detection characteristics of the laser beams 91 and 91' degrade due to distribution and leakage as the laser beams 91 and 91' propagate through the waveguides 93 and 93'. When considering the characteristics, the optical coupling member may have various shapes. For example, the shape as shown in FIG. 9 is possible. The constituent elements are the same as those of the element shown in FIG. 8, so the description will be omitted. In the configuration as shown in FIG. 8, there is an advantage that the laser beam 121 and 121' is easily inputted into the waveguides 123 and 123' compared with the configuration shown in FIG. 8. (In FIG. 8, to easily input the laser beams 91 and 91' into the waveguides 93 and 93', an example is shown in which fibers 98 and 98' and fiber coupling members 99 and 99' are used.)

By using the element of the present invention as a detector, a highly sensitive detection can be performed according to the space distribution of the terahertz wave. A terahertz time domain spectral device and a tomography device as described in the above embodiments can be formed by using the present element. In this case, the generation element may be any element such as an element using a Cherenkov type phase matching method as used in the present invention and a generation element using a conventional photoconductive element.

Although, in the embodiments, the light is inputted into an end opposite to the end from which the light is generated, the light may be inputted into the same end as that from which the light is generated. In this case, the length in which the phases are matched becomes short, so the signal intensity becomes small. An optical waveguide may have a ridge shape or a slab shape. Although an example is described in which a terahertz pulse is detected by a pulse laser beam, as described in the third embodiment, it is possible to input a laser beam having two frequencies and detect a monochromatic terahertz wave corresponding to the difference frequency component. In this case, if the difference frequency is changed, it is possible to cut out a terahertz wave having a desired frequency like a filter and detect the electric field amplitude.

As a method for detecting the terahertz wave, a method is described which detects that the polarization state of light is changed by the first-order electro-optic effect of the coupled terahertz waves. However, a method may be used in which a phase change of the light propagating through the waveguide or an optical signal corresponding to the difference frequency between the frequency of the light propagating through the waveguide and the frequency of coupled terahertz waves is detected as a change of the light propagation state. In other words, a method for detecting an optical beat signal may be used.

Although the preferred embodiments of the present invention have been described, the present invention is not limited to the embodiments, but various changes and modifications are possible within the scope of the invention. The technical elements described in this specification or the drawings exert technical usefulness solely or in combination, and are not limited to the combination described in the claims when the application is filed. The techniques described and illustrated herein accomplish multiple objects simultaneously, and accomplishing even one of the objects achieves technical usefulness.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2010-187564 filed Aug. 24, 2010 and No. 2011-161412 filed Jul. 22, 2011, each of which is hereby incorporated by reference herein in its entirety.

What is claimed is:

1. A terahertz wave generation element comprising:
a plurality of waveguides including an electro-optic crystal; and
an optical coupling member configured to extract a terahertz wave to the outside, the terahertz wave being generated when light propagates through the waveguides,
wherein the waveguides are arranged to be rotationally symmetric with respect to a predetermined axis;
the optical coupling member is arranged so that wave fronts of the terahertz waves generated from the waveguides are matched together, and
an angles between the predetermined axis and a terahertz wave emitting surface of the optical coupling member is represented by the following formula:

$\tan\theta_A = (n_0/n_{clad} - \cos(\theta_p - \theta_c))/\sin(\theta_p - \theta_c)$ here, $\theta_p$: an angle between a light propagation direction in the waveguide and the predetermined axis,
$\theta_c$: an angle between the light propagation direction in the waveguide and the terahertz wave emitted from the waveguide,
$n_{clad}$: a refractive index of the optical coupling member at a wavelength of the terahertz wave, and
$n_0$: a refractive index at a portion in contact with the optical coupling member on the terahertz wave emitting surface.

2. A terahertz time domain spectral device comprising:
a generation unit configured to generate a terahertz wave;
a detection unit configured to detect a terahertz wave radiated from the generation unit; and
a delay unit configured to adjust delay time between the time when the terahertz wave is generated in the generation unit and the time when the terahertz wave is detected in the detection unit,
wherein the generation unit includes the terahertz wave generation element according to claim 1.

3. The terahertz time domain spectral device according to claim 2, wherein
the detection unit is configured as a tomography device which detects a terahertz wave radiated from the generation unit and reflected from a sample and images an internal structure of the sample by analyzing light reflected from the sample.

4. The terahertz time domain spectral device according to claim 2, wherein
light from an end of the waveguide of the terahertz wave generation element is used as probe light to the detection unit, and
the delay unit adjusts delay time between the time when the light reaches the waveguide of the terahertz wave generation element and the time when the probe light reaches the detection unit.

5. A terahertz wave generation element comprising:
a plurality of waveguides including an electro-optic crystal; and
an optical coupling member configured to extract a terahertz wave to the outside, the terahertz wave being generated when light propagates through the waveguides,
wherein the waveguides are arranged to be rotationally symmetric with respect to a predetermined axis,
the optical coupling member is arranged so that wave fronts of the terahertz waves generated from the waveguides are matched together, and
each of the waveguides includes a high refractive index layer to be a core for the propagated light and a low refractive index layer to be a cladding, and
at least one of the low refractive index layer is in contact with and sandwiched by the high refractive index layer and the optical coupling member, and a thickness d of the low refractive index layer is represented by
$a < d < \lambda_{eq}/10$ when a thickness in which light intensity of light propagating through the waveguide becomes $1/e^2$ of light intensity in the core (e is the base of natural logarithm) is a, and an equivalent wavelength in the low refractive index layer at a highest frequency of the terahertz wave extracted to the outside is $\lambda_{eq}$.

6. A terahertz wave detection element comprising:
a plurality of waveguides including an electro-optic crystal; and
an optical coupling member configured to input a terahertz wave into the waveguides,
wherein the waveguides are arranged to be rotationally symmetric with respect to a predetermined axis, and
the optical coupling member is arranged to divide a wave front of the terahertz wave and input the divided wave fronts into the waveguides.

7. The terahertz wave detection element according to claim 6, wherein a crystal axis of each of the electro-optic crystals of the waveguides is set so that a propagation state of light propagating through the waveguide changes when the terahertz wave is inputted into each of the waveguides.

8. A terahertz time domain spectral device comprising:
a generation unit configured to generate a terahertz wave;
a detection unit configured to detect a terahertz wave radiated from the generation unit; and
a delay unit configured to adjust delay time between the time when the terahertz wave is generated in the generation unit and the time when the terahertz wave is detected in the detection unit,
wherein the detection unit includes the terahertz wave detection element according to claim 6.

9. The terahertz time domain spectral device according to claim 8, wherein
the detection unit is configured as a tomography device which detects a terahertz wave radiated from the generation unit and reflected from a sample and images an internal structure of the sample by analyzing light reflected from the sample.

* * * * *